United States Patent [19]
Nishida et al.

[11] Patent Number: 5,686,197
[45] Date of Patent: Nov. 11, 1997

[54] FUEL CELL

[75] Inventors: Koji Nishida, Anjo; Daisuke Yamada, Toyota; Taku Matsutani, Ooshima, all of Japan

[73] Assignee: Aisin Seiki Kabushiki Kaisha, Kariya, Japan

[21] Appl. No.: 493,171

[22] Filed: Jun. 21, 1995

[30] Foreign Application Priority Data

Jun. 29, 1994 [JP] Japan .................................. 6-147488

[51] Int. Cl.$^6$ .................................................. H01M 8/10
[52] U.S. Cl. .................................................. 429/30; 429/34
[58] Field of Search .................................. 429/30, 34, 32

[56] References Cited

U.S. PATENT DOCUMENTS 4,824,742  4/1989  Parry ..................................... 429/30 X

FOREIGN PATENT DOCUMENTS 0 629 015  12/1994  European Pat. Off. .
2-37669   2/1990   Japan .

*Primary Examiner*—John S. Maples
*Attorney, Agent, or Firm*—Burns, Doane, Swecker & Mathis, LLP

[57] ABSTRACT

A fuel cell includes a sheet-shaped solid electrolyte having opposite surfaces, and exhibiting ion conductivity, a plurality of fuel electrodes disposed adjacent to each other on one of the opposite surfaces of the solid electrolyte, to which fuel working as a negative electrode active material is supplied, a plurality of oxygen electrodes disposed adjacent to each other on the other one of the opposite surfaces of the solid electrolyte, to which oxygen working as a positive electrode active material is supplied, the fuel electrodes being electrically connected to the oxygen electrodes in series. The fuel cell is downsized and lightweighted, but can produce a high voltage output, because a plurality of fuel and oxygen electrodes are disposed on one cell. A plurality of the cells can laminated so as to face the same electrodes of the neighboring cells. The cell can further include an electricity collector, a cooling member, or a separator which is laminated on at least one of the fuel and oxygen electrodes.

17 Claims, 9 Drawing Sheets

FUEL CELL

BACKGROUND OF THE INVENTION

1. Field of the Invention

The present invention relates to a fuel cell which is provided with a solid electrolyte exhibiting ion conductivity. It is, for example, applied to a polymer-film type fuel cell.

2. Description of Related Art

The related art will be described with reference to a polymer-film type fuel cell which utilizes hydrogen as fuel. FIG. 16 illustrates the principle of a conventional polymer-film type fuel cell. As illustrated in FIG. 16, the conventional polymer-film type fuel cell includes a polymer film 100 which exhibits ion conductivity and works as a solid electrolyte, a fuel electrode 102 laminated on one of the opposite surfaces of the polymer film 100, and an oxygen electrode 104 laminated on the other one of the opposite surfaces of the polymer film 100. This fuel cell operates to produce electricity under the following principle; namely: hydrogen is supplied to the fuel electrode 102. Hydrogen is fuel operating as a negative electrode active material. Oxygen is supplied to the oxygen electrode 104. Oxygen operates as a positive electrode active material. At the fuel electrode 102, a reaction (e.g., $H_2 \rightarrow 2H^+ + 2e^-$) occurs. The hydrogen ions $H^+$ produced by this reaction pass through the polymer film 100 to arrive at the oxygen electrode 104. The electrons $e^-$ produced by the reaction arrive at the oxygen electrode 104 by way of a connector wire 106. As a result, at the oxygen electrode 104, a reaction (e.g., $2H^+ + (1/2)O_2 + 2e^- \rightarrow H_2O$) occurs. Thus, this fuel cell functions as a battery because it produces the electrons $e^-$ to generate electric current.

The conventional polymer-film type fuel cell constitutes independent cells of an actual fuel cell, but it produces a low voltage output. Hence, in actual applications, a large number (e.g., about 500 pieces) of the polymer-film type fuel cells are laminated to electrically connect them in series in order to produce a high voltage output. However, the more the polymer-film type fuel cells are laminated, the larger the actual fuel cell becomes in terms of size and the heavier it becomes in terms of weight. Moreover, within the actual fuel cell, the construction for supplying hydrogen, the construction for supplying oxygen, its sealing arrangement, and so on, are likely to be complicated. Consequently, no fuel cells have been available so far which are satisfactory in terms of performance, and the like.

SUMMARY OF THE INVENTION

The present invention has been developed in view of the above-described circumstances.

It is a primary object of the present invention to provide a fuel cell capable of advantageously producing a high voltage output by employing a system in which fuel electrodes are disposed adjacent to each other on one one of the opposite surfaces of a sheet-shaped solid electrolyte, oxygen electrodes are disposed adjacent to each other on the other one of the opposite surfaces thereof, and the fuel electrodes and the oxygen electrodes are connected electrically with each other in series.

It is a secondary object of the present invention to provide a fuel cell capable of beneficially exhibiting desired battery performance by employing a system in which the same electrodes face with each other (i.e., oxygen electrodes disposed on one of cells face with oxygen electrodes of a cell neighboring on the one of cells, and fuel electrodes disposed of one of cells face with fuel electrodes of a cell neighboring on the one of cells), thereby simplifying constructions for supplying oxygen and fuel, and thereby inhibiting faulty electric communication between the different electrodes which are disposed on neighboring cells (i.e., between oxygen electrodes and fuel electrodes) even when a separator is damaged, separator which is disposed between neighboring cells.

It is a tertiary object of the present invention to provide a fuel cell whose contact electric resistance is reduced advantageously between an electricity collector and at least one of oxygen electrodes and fuel electrodes by employing a system in which pressure resulting from a coolant is utilized.

In various aspects of the present invention hereinafter described, a sheet-shaped solid electrolyte having opposite surfaces and exhibiting ion conductivity is employed, one of the opposite surfaces is provided with a plurality of fuel electrodes thereon, and the other one of the opposite surfaces is provided with a plurality of oxygen electrodes thereon. This is one of common major components of the present invention.

In a first aspect of the present invention, a fuel cell comprises:

a sheet-shaped solid electrolyte having opposite surfaces, and exhibiting ion conductivity;

at least two fuel electrodes disposed adjacent to each other on one of the opposite surfaces of the solid electrolyte, to which fuel working as a negative electrode active material is supplied;

at least two oxygen electrodes disposed adjacent to each other on the other one of the opposite surfaces of the solid electrolyte, to which oxygen working as a positive electrode active material is supplied;

the fuel electrodes, disposed on one of the opposite surfaces of the solid electrolyte, being electrically connected to the oxygen electrodes, disposed on the other one of the opposite surfaces of the solid electrolyte, in series.

In the first aspect of the present invention, the fuel electrodes, disposed on one of the opposite surfaces of the solid electrolyte, are electrically connected to the oxygen electrodes, disposed on the other one of the opposite surfaces of the solid electrolyte, in series. Accordingly, it is possible to constitute a plurality of batteries over one sheet-shaped solid electrolyte. The thus constituted batteries are electrically connected to each other in series, thereby enlarging a voltage output produced per one sheet-shaped solid electrolyte. As a result, it is advantageous to employ this arrangement for providing a fuel cell capable of producing a high voltage output. Although this fuel cell is constructed so as to produce a high voltage output, it is practically downsized and lightweighted.

In a second aspect of the present invention, a fuel cell comprises:

a plurality of cells;

an oxygen supply passage; and a fuel supply passage;

the cells include:

a sheet-shaped solid electrolyte having opposite surfaces, and exhibiting ion conductivity;

at least two fuel electrodes disposed adjacent to each other on one of the opposite surfaces of the solid electrolyte, to which fuel working as a negative electrode active material is supplied;

at least two oxygen electrodes disposed adjacent to each other on the other one of the opposite surfaces of the solid electrolyte, and electrically connected to the fuel electrodes, to which oxygen working as a positive electrode active material is supplied; and one of the cells being held between another one of the cells neighboring thereon in a direction and still another one of the cells neighboring thereon in another direction;

the oxygen electrodes of one of the cells facing with the oxygen electrodes of another one of the cells, neighboring thereon in a direction, so as to interpose the oxygen supply passage therebetween; and the fuel electrodes of one of the cells facing with the oxygen electrodes of still another one of the cells, neighboring thereon in another direction, so as to interpose the fuel supply passage therebetween.

In the second aspect of the present invention, the oxygen electrodes of the neighboring cells face with each other so as to interpose the oxygen supply passage therebetween, and the fuel electrodes of the neighboring cells face with each other so as to interpose the fuel supply passage therebetween. Accordingly, this arrangement enables to advantageously thin out the fuel cell in thickness-wise direction, and at the same time to securely give the oxygen supply passage and the fuel supply passage a desired thickness. Thus, the oxygen supply passage and the fuel supply passage can be simplified usefully. In addition, even when a separator is damaged which is disposed between neighboring cells, faulty electric communication can be inhibited between the different electrodes (i.e., between oxygen electrodes and fuel electrodes) of the neighboring cells. As a result, with this arrangement, it is possible to securely give a fuel cell desired battery performance.

In a third aspect of the present invention, a fuel cell comprises:

a sheet-shaped solid electrolyte having opposite surfaces, and exhibiting ion conductivity;

at least two fuel electrodes disposed adjacent to each other on one of the opposite surfaces of the solid electrolyte, to which fuel working as a negative electrode active material is supplied;

at least two oxygen electrodes disposed adjacent to each other on the other one of the opposite surfaces of the solid electrolyte, and electrically connected to the fuel electrodes, to which oxygen working as a positive electrode active material is supplied;

an electricity collector disposed on at least one of the opposite surfaces of the solid electrolyte, and laminated on at least one of the fuel electrodes and the oxygen electrodes; and a cooling member laminated on the electric collector, including a coolant passage in which a coolant flows, urging the electricity collector toward at least one of the fuel electrodes and the oxygen electrodes by means of pressure resulting from the coolant flowing in the coolant passage.

In the third aspect of the present invention, the electricity collector is urged toward at least one of the oxygen electrodes and the fuel electrodes by means of pressure resulting from the coolant which flows in the coolant passage. Accordingly, the tightness and the contactability are enhanced at the boundary areas between the electricity collector and at least one of the oxygen electrodes and the fuel electrodes. As a result, the contact electric resistance is reduced advantageously therebetween. In other words, this arrangement secures the electricity collectability in the electricity collector beneficially, and it is appropriate for manufacturing a fuel cell capable of producing a high voltage output. Moreover, since the coolant flows in the coolant passage of the cooling member which is laminated on the electricity collector, the cooling capability is improved usefully within the fuel cell.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

The preferred embodiments hereinafter described are polymer-film type fuel cells which operate with hydrogen as fuel, and to which the present invention is applied.

First Preferred Embodiment

Figure 1:
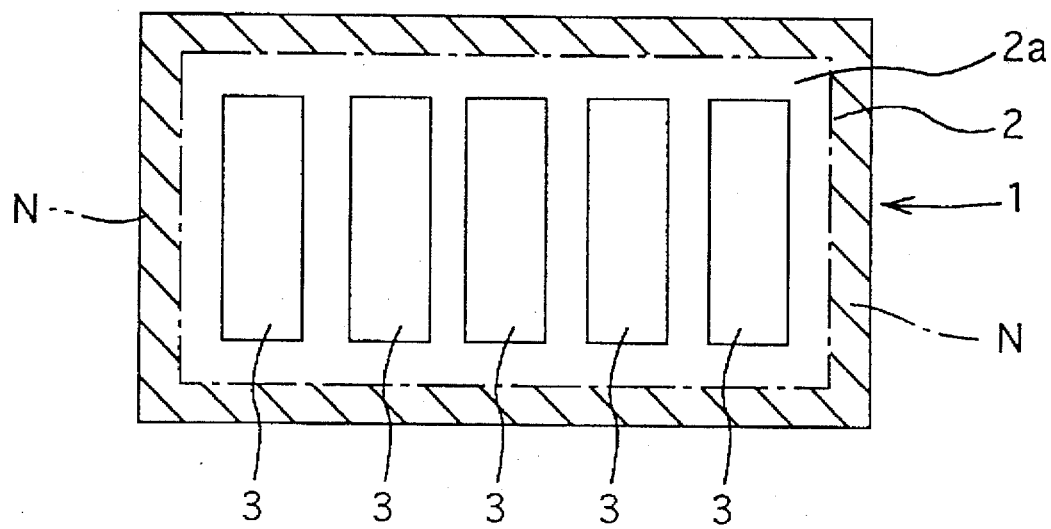
FIG. 1 is a plan view of a polymer film on which fuel electrodes are disposed in a First Preferred Embodiment of a fuel cell according to the present invention.
Figure 2:
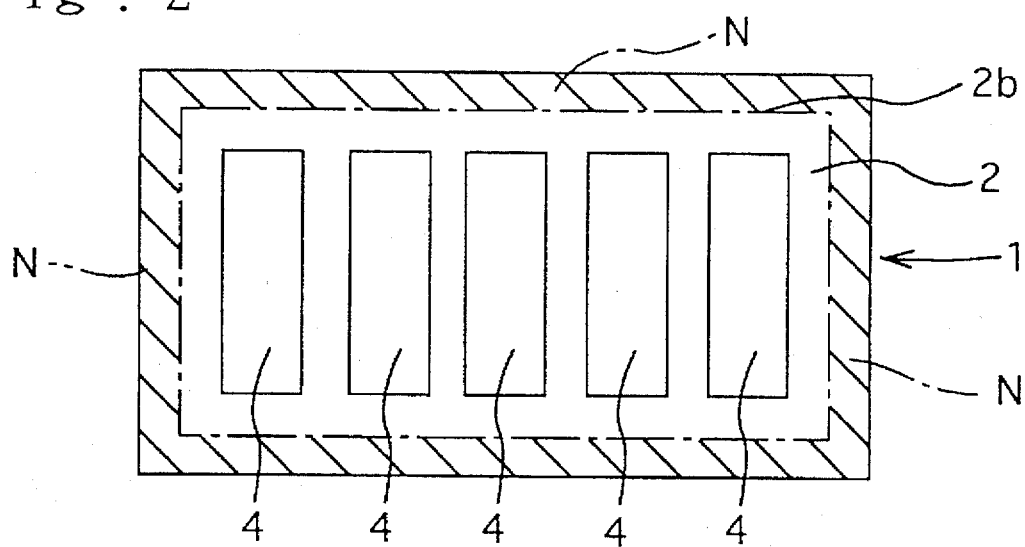
FIG. 2 is a plan view of the polymer film on which oxygen electrodes are disposed in the First Preferred Embodiment of the present fuel cell.
Figure 3:
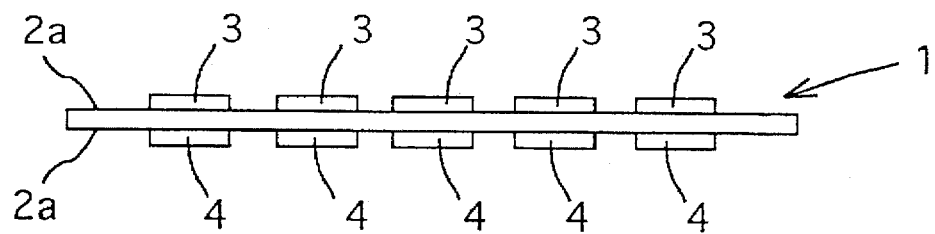
FIG. 3 is a cross-sectional view of the polymer film on which the fuel electrodes and the oxygen electrodes are disposed in the First Preferred Embodiment of the present fuel cell.

With reference to FIGS. 1 through 3, a cell 1 constituting a polymer-film type fuel cell will be hereinafter described. The cell 1 is provided with a thin-thickness sheet-shaped polymer film 2 which operates as a solid electrolyte capable of transferring hydrogen ions $H^+$ therethrough. The polymer film 2, for example, can be formed of a cation-exchange resin film (e.g., SPE: Solid Polymer Electrolyte). As illustrated in FIG. 1, on one of the surfaces (e.g., surface 2a) of the sheet-shaped polymer film 2, there are bonded five fuel electrodes 3 adjacent to each other. The fuel electrodes 3 operate as a negative electrode. Fuel (e.g., hydrogen which works as a negative electrode active material) is supplied to the fuel electrodes 3.

As illustrated in FIG. 2, on the other one of the surfaces (e.g., surface 2b) of the sheet-shaped polymer film 2, there are bonded five oxygen electrodes 4 adjacent to each other. The oxygen electrodes 4 operate as a positive electrode. Air is supplied to the oxygen electrodes 4. The air includes oxygen which works as a positive electrode active material. The oxygen electrodes 4 and the fuel electrodes 3 are, for example, a carbon-based electrode, respectively.

Figure 4:
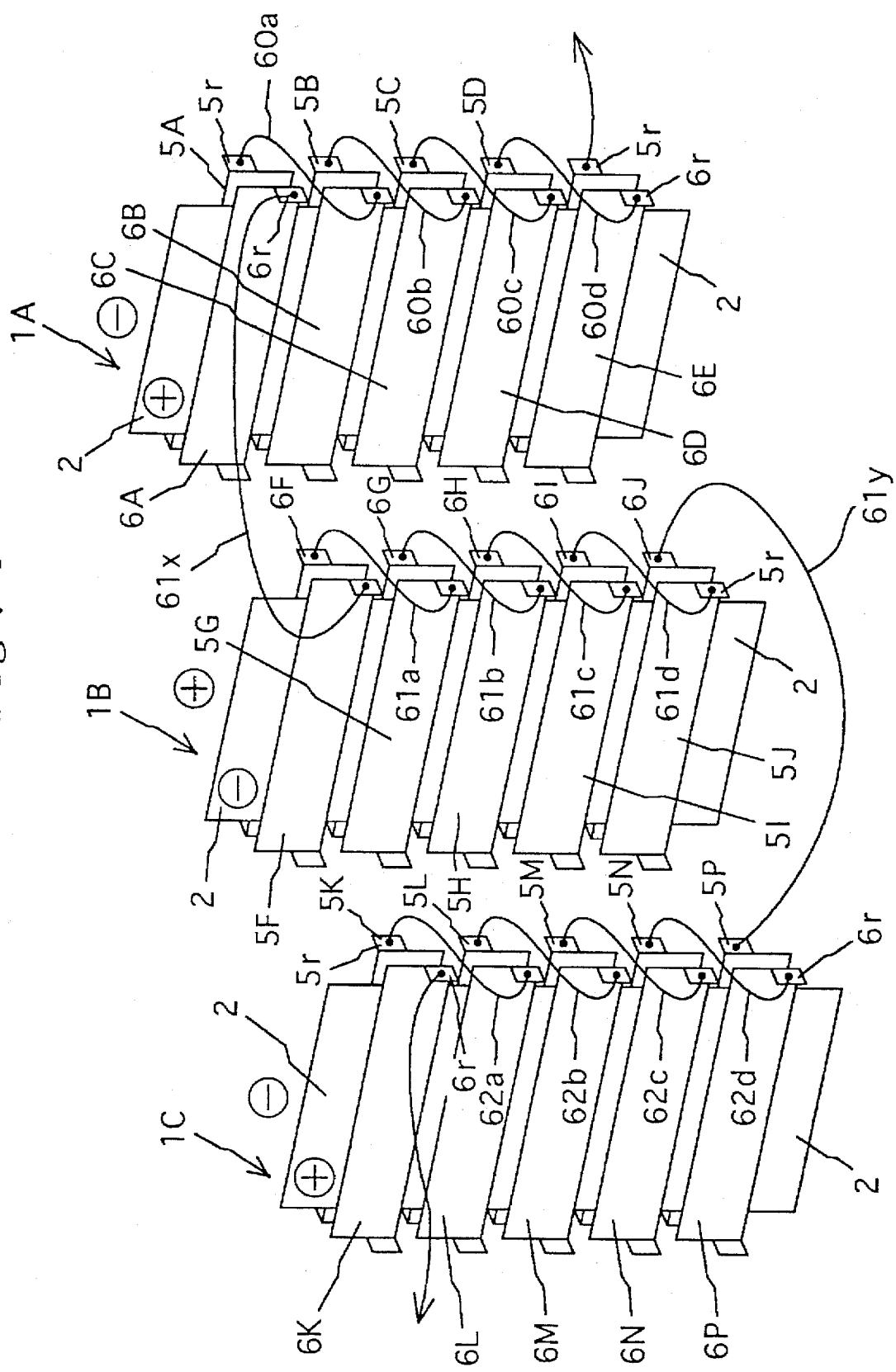
FIG. 4 is a schematic perspective view of major portions in the First Preferred Embodiment of the present fuel cell, and illustrates how the fuel electrodes and the oxygen electrodes are connected electrically in series.

FIG. 4 schematically illustrates major portions of the present fuel cell whose laminated cells 1A, 1B and 1C are exploded. On the other hand, FIG. 6 schematically illustrates major portions of the fuel cell whose cells 1A, 1B, and so on, are laminated.

Figure 6:
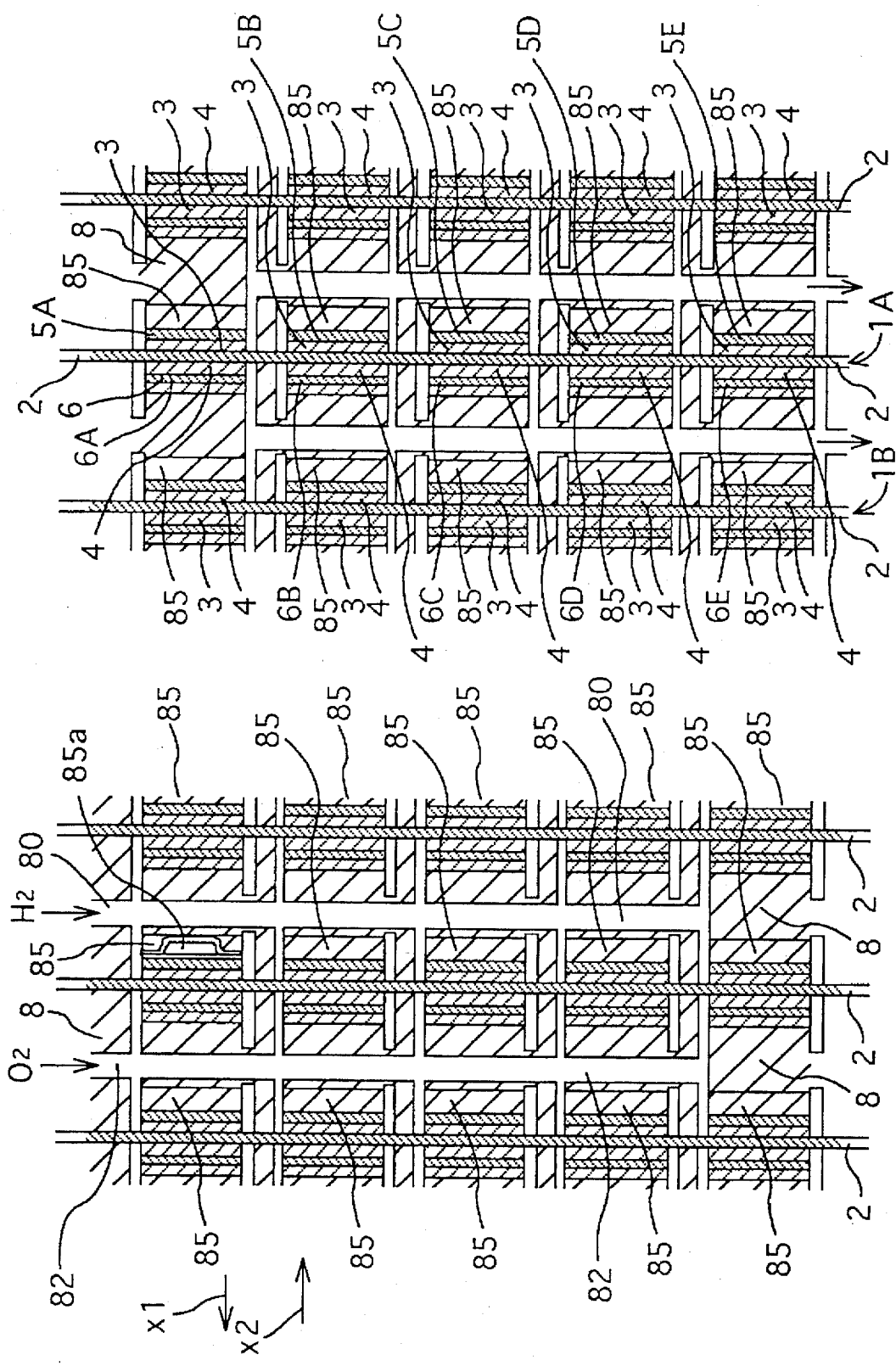
FIG. 6 is a schematic cross-sectional view of major portions in the First Preferred Embodiment of the present fuel cell.

As illustrated in FIG. 6, five fuel-electrode electricity collector plates 5 (e.g., 5A, 5B, 5C, 5D and 5E) are disposed on one of the sides with respect to the polymer film 2, and they are laminated respectively on the five fuel electrodes 3 which are disposed adjacent to each other on one of the surfaces of the cell 1A. Further, as illustrated in FIG. 6, five oxygen-electrode electricity collector plates 6 (e.g., 6A, 6B, 6C, 6D and 6E) are disposed on the other one of the sides with respect to the polymer film 2, and they are laminated respectively on the five oxygen electrodes 4 which are disposed adjacent to each other on the other one of the surfaces of the cell 1A. The fuel-electrode electricity collector plates 5 and the oxygen-electrode electricity collector plates 6 are formed as a rectangular shape, and they are made of copper.

The First Preferred Embodiment is characterized in that, in the cell 1A, the fuel electrodes 3, disposed adjacent to each other on one of the surfaces of the polymer film 2, are connected electrically in series with the oxygen electrodes 4, disposed adjacent to each other on the other one of the surfaces of the polymer film 2. Likewise, in another cell 1, the fuel electrodes 3 are connected electrically in series with the oxygen electrodes 4.

FIG. 4 is a schematic perspective view of major portions of the present fuel cell, and illustrates how the fuel electrodes 3 are connected electrically in series with the oxygen electrodes 4. First, the electric connection in the cell 1A on the right-hand side of FIG. 4 will be described in detail. In the cell 1A, the fuel-electrode electricity collector plate 5A is electrically connected with the oxygen-electrode electricity collector plate 6B by a conductive wire 60a. The fuel-electrode electricity collector plate 5B of the cell 1A is electrically connected with the oxygen-electrode electricity collector plate 6C of the cell 1A by a conductive wire 60b. The fuel-electrode electricity collector plate 5C of the cell 1A is electrically connected with the oxygen-electrode electricity collector plate 6D of the cell 1A by a conductive wire 60c. The fuel-electrode electricity collector plate 5D of the cell 1A is electrically connected with the oxygen-electrode electricity collector plate 6E of the cell 1A by a conductive wire 60d. Thus, in the cell 1A, the different electrodes are electrically connected with each other in series.

Second, the electric connection in the cell 1B on the middle of FIG. 4 will be described in detail. In the cell 1B, the fuel-electrode electricity collector plate 5F of the cell 1B is electrically connected with the oxygen-electrode electricity collector plate 6A of the cell 1A, which is disposed to neighbor on the cell 1B, by a conductive wire 61x. The fuel-electrode electricity collector plate 5G of the cell 1B is electrically connected with the oxygen-electrode electricity collector plate 6F of the cell 1B by a conductive wire 61a. The fuel-electrode electricity collector plate 5H of the cell 1B is electrically connected with the oxygen-electrode electricity collector plate 6G of the cell 1B by a conductive wire 61b. The fuel-electrode electricity collector plate 5I of the cell 1B is electrically connected with the oxygen-electrode electricity collector plate 6H of the cell 1B by a conductive wire 61c. The fuel-electrode electricity collector plate 5J of the cell 1B is electrically connected with the oxygen-electrode electricity collector plate 6I of the cell 1B by a conductive wire 61d. Thus, in the cell 1B, the different electrodes are electrically connected with each other in series.

Third, in the electric connection in the cell 1C on the left-hand side of FIG. 4, the fuel-electrode electricity collector plates 5K, 5L, 5M, 5N of the cell 1C are electrically connected with the oxygen-electrode electricity collector plates 6L, 6M, 6N, 6P of the cell 1C by way of conductive wire 62a, 62b, 62c, 62d, respectively. The fuel-electrode electricity collector plate 5P of the cell 1C is electrically connected with the oxygen-electrode electricity collector plate 6J of the cell 1B, which is disposed to neighbor on the cell 1C, by a conductive wire 61y. Thus, in the cell 1C, the different electrodes are electrically connected with each other in series.

As shown in FIG. 4, a projection 5r is formed at an end of the fuel-electrode electricity collector plates 5 in their length-wise direction. Similarly, a projection 6r is formed at an end of the oxygen-electrode electricity collector plates 6 in their length-wise direction. The conductive wires are connected to the fuel-electrode electricity collector plates 5 and the oxygen-electrode electricity collector plates 6 by means of these projections 5r, 6r.

By thus carrying out the connection, in each of the cells 1, the fuel-electrode electricity collector plates 5 for the fuel electrodes 3, which are disposed on one of the surfaces of the polymer film 2, are connected electrically in series with the oxygen-electrode electricity collector plates 6 for the oxygen electrodes 4, which are disposed on the other one of the surfaces of the polymer film 2.

As can be appreciated from FIG. 4, in the First Preferred Embodiment, 5 batteries are formed with respect to one sheet-shaped polymer film 2. Hence, it is possible to increase a voltage output which is produced per one polymer film 2. As a result, this arrangement of the First Preferred Embodiment can enlarge an overall voltage output of a polymer-film type fuel cell beneficially.

Figure 5:
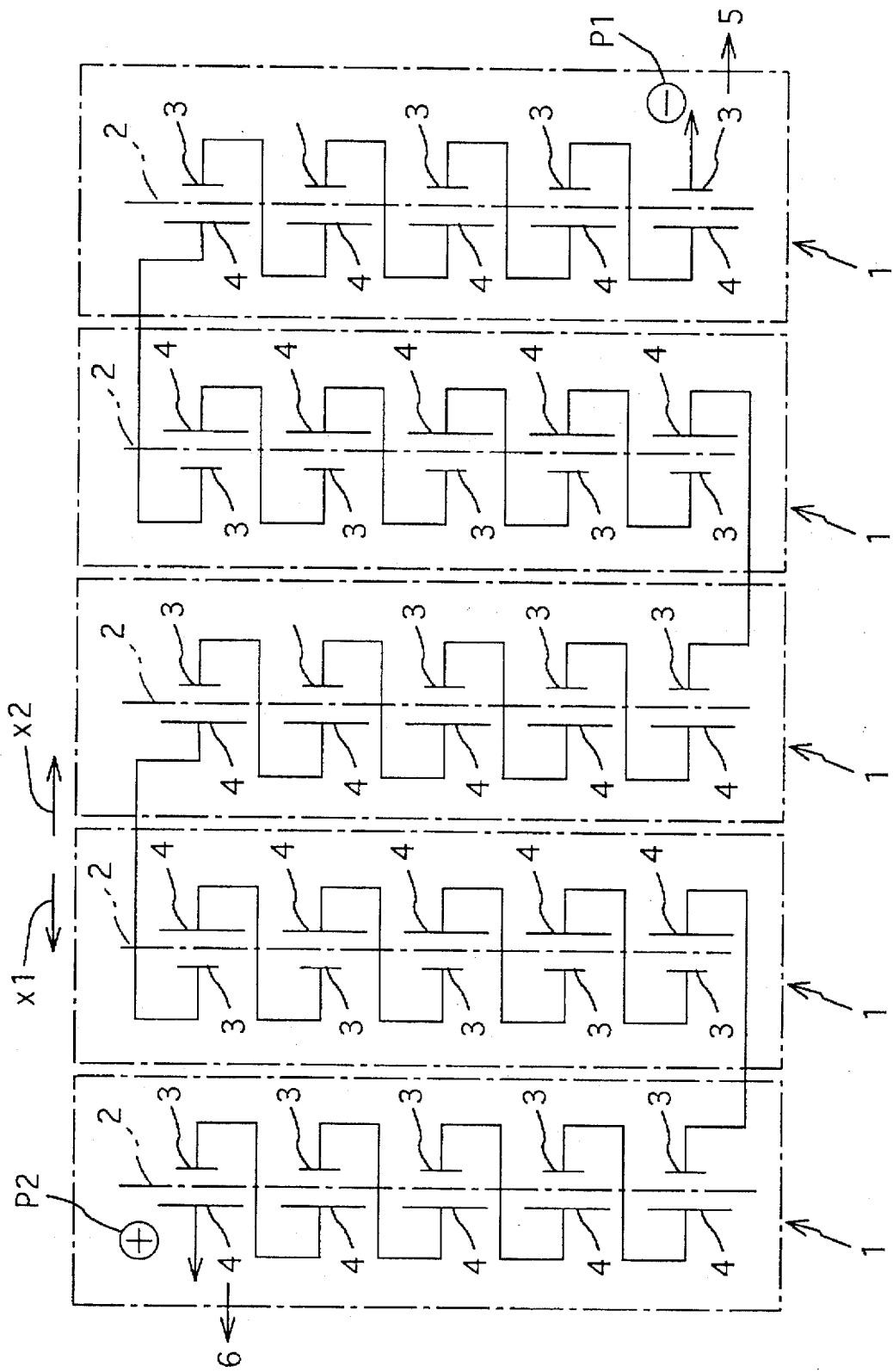
FIG. 5 is a construction diagram for illustrating how the fuel electrodes and the oxygen electrodes are connected electrically in series in the First Preferred Embodiment of the present fuel cell.

FIG. 5 schematically illustrates how the electric connection is established in the First Preferred Embodiment. In FIG. 5, an overall negative electrode of the First Preferred Embodiment is designated at "P1," and is constituted by one of the fuel electrode 3 and one of the fuel-electrode electricity collector plates 5 which are adapted to be a take-out port. Also in FIG. 5, an overall positive electrode of the First Preferred Embodiment is designated at "P2," and is constituted by one of the oxygen electrodes 4 and one of the oxygen-electrode electricity collector plates 6 which are adapted to be a take-out port.

The First Preferred Embodiment is built by laminating a plurality of the thus constructed cells 1 in their thickness-wise directions (e.g., the directions "X1" and "X2" of FIG. 5). The number of the laminated cells 1 can be determined as desired. For instance, the cells 1 can be laminated in a number of tens or hundreds. In FIG. 5, the cells 1 are laminated in a predetermined number to help understand the present invention with ease. When a plurality of the cells 1 are thus laminated, a polymer-film type fuel cell can further advantageously produce an increased voltage output; namely: even if it is downsized, it can produce an enlarged voltage output, for example, hundreds of volts or more.

In the First Preferred Embodiment, as illustrated in FIG. 6, there are disposed a plurality of separators 8 between the cells 1. The separators 8 are adapted to separate between the fuel electrodes 3 and the oxygen electrodes 4, the electrodes which are different to each other. Further, there are formed fuel supply passages 80 and oxygen supply passages 82 by the separators 8. The fuel supply passages 80 communicate with an external fuel supply source (e.g., a hydrogen gas source). The oxygen supply passages 82 communicate with an external oxygen supply source (e.g., the outside air).

Figure 7:
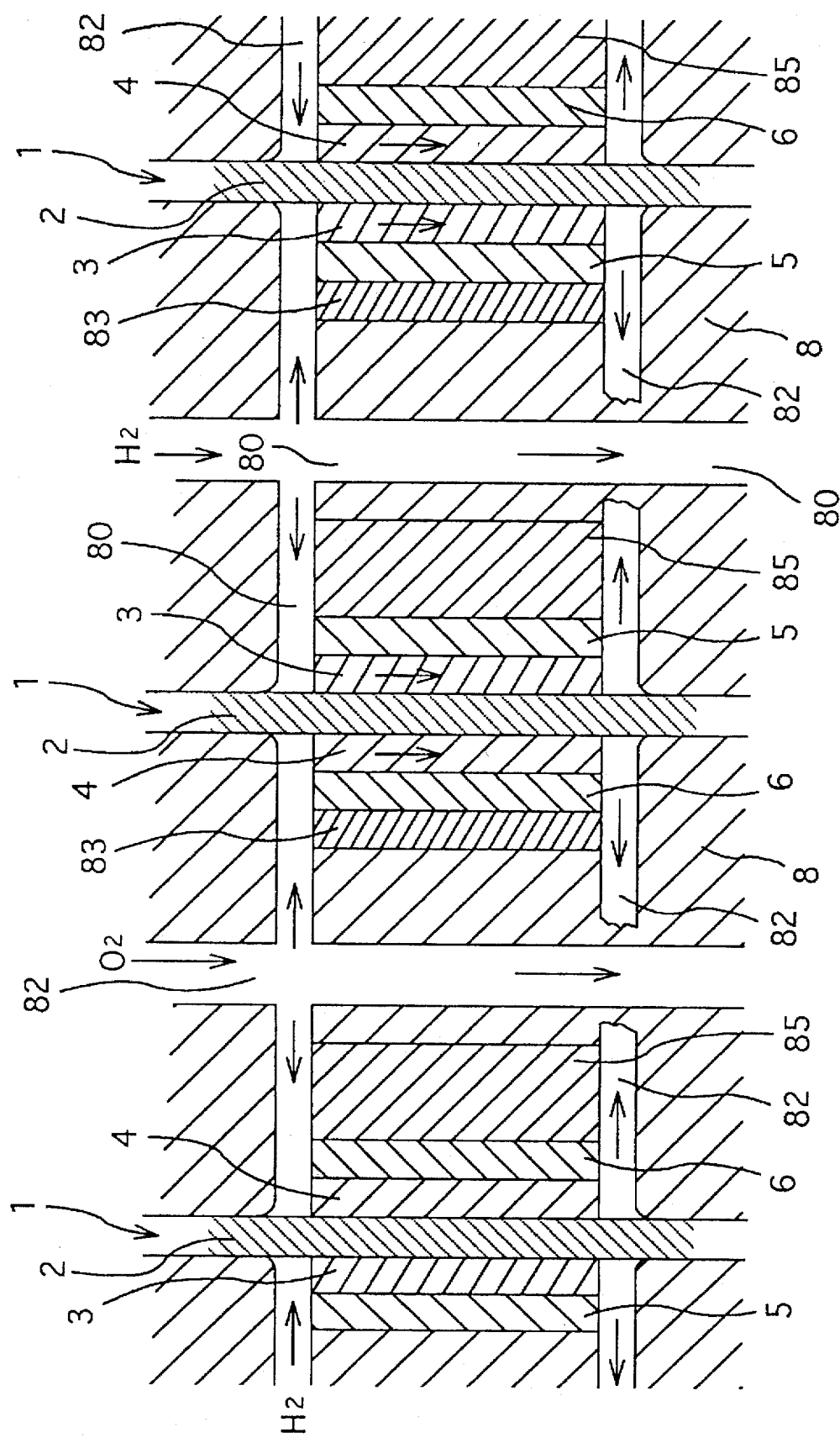
FIG. 7 is an enlarged schematic cross-sectional view of major portions in the First Preferred Embodiment of the present fuel cell.

An extra arrangements of the First Preferred Embodiment will be hereinafter described. In the First Preferred Embodiment, as illustrated in FIG. 7, the oxygen electrodes 4 of the neighboring cells 1 are disposed so as to face each other with respect to the oxygen supply passages 82. Likewise, as also illustrated in FIG. 7, the fuel electrodes 3 of the neighboring cells 1 are disposed so as to face each other with respect to the fuel supply passages 80.

To put it differently, in the First Preferred Embodiment, the same electrodes (e.g., the oxygen electrodes 4) are disposed on both sides of the oxygen supply passages 82 in the laminating direction of the cells 1. Likewise, the same electrodes (e.g., the fuel electrodes 3) are disposed on both sides of the hydrogen supply passages 80 in the laminating direction of the cells 1.

By employing this arrangement in which the same electrodes are disposed so as to face each other, the present fuel cell according to the First Preferred Embodiment can be reduced in terms of thickness, and at the same time can securely provide an appropriate thickness for the oxygen supply passages 82. Hence, the thus constructed oxygen supply passages 82 of the First Preferred Embodiment enable to simplify the construction of oxygen or air supply system in fuel cell. Similarly, the First Preferred Embodiment can be reduced in terms of thickness, and at the same time can securely provide an appropriate thickness for the hydrogen supply passages 80. Hence, the thus constructed fuel supply passages 80 of the First Preferred Embodiment enable to simplify the construction of fuel or hydrogen supply system in fuel cell. In addition, with this arrangement, the water produced by the reaction around the oxygen electrodes 4 can be evacuated practically, thereby giving the present fuel cell a secured battery performance beneficially.

On the other hand, in conventional polymer-film type fuel cell in which a plurality of cells are laminated and which has been provided so far, the different electrodes (e.g., oxygen electrodes and fuel electrodes) of the neighboring cells are disposed so as to face each other with respect to the separators. In this conventional arrangement, when the separators are damaged to crack by unprecedented accidents, the different electrodes (e.g., oxygen electrodes and fuel electrodes) of the neighboring cells may be in faulty electric communication. As a result, conventional polymer-film type fuel cell may be troubled so that it cannot to securely exhibit satisfactory battery performance. Moreover, in this conventional arrangement in which the different electrodes are disposed so as to face each other with respect to the separators, the fuel supply passages and the oxygen supply passages must be formed in the separators. Consequently, when the separators are broken, the oxygen and hydrogen flowing in the two passages may be mixed. As a result, the oxygen and hydrogen may react each other to burn.

As can be appreciated from FIG. 7, in the First Preferred Embodiment, in order to avoid the possible drawback, the oxygen electrodes 4 (e.g., one of the same kinds of electrodes) of the neighboring cells 1 are disposed so as to face each other while interposing the oxygen supply passages 82 therebetween. Further, the fuel electrodes 3 (e.g., the other one of the same kinds of electrodes) of the neighboring cells 1 are disposed so as to face each other while interposing the fuel supply passages 80 therebetween. As a result, even if the separators 8 should have been damaged, it is possible to avoid the fear for faulty electric communication between the different electrodes (e.g., between the oxygen electrodes 4 and the fuel electrodes 3). Thus, this arrangement allows for a fuel cell to produce a required voltage output. Furthermore, since the same electrodes are disposed so as to face each other while interposing the separators 8, it is only necessary to form either the fuel supply passages 82 or the oxygen supply passages 80 in the separators 8. Accordingly, even when the separators 8 are damaged, there are no fears for mixing the hydrogen and oxygen. Thus, there is little danger of reacting the hydrogen and oxygen to burn.

In particular, as can be appreciated from FIGS. 1 through 3, the present fuel cell according to the First Preferred Embodiment is adapted to produce a high voltage output, because the fuel electrodes 3 and the oxygen electrodes 4 are disposed in a quantity of 5 per each of the cells 1. However, it is needed to provide a sealing region only around the outer periphery of the polymer film 2 as shown by a hatched area designated at "N" in FIGS. 1 and 2. These sealing regions correspond to those of conventional polymer-film type fuel cell. Thus, in accordance with this arrangement of the First Preferred Embodiment, a polymer-film type fuel cell can produce a high voltage output, and at the same time its internal sealing system can be practically inhibited from complicating.

Moreover, in the present fuel cell according to the First Preferred Embodiment, resin sheets 83 having a thin thickness are laminated on the fuel-electrode and oxygen-electrode electricity collector plates 5 and 6. The resin sheets 83 primarily function to absorb dimensional fluctuations.

Figure 9:
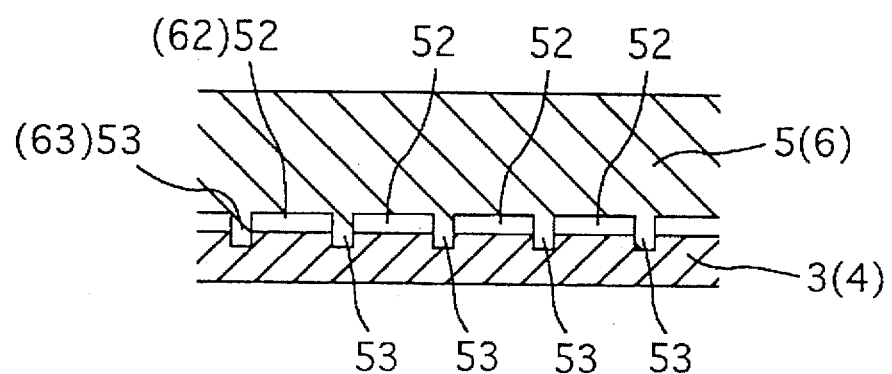
FIG. 9 is a schematic cross-sectional view of a construction which is adapted for connecting an electricity collector plate and a fuel electrode or an oxygen electrode in the First Preferred Embodiment of the present fuel cell.

In addition, as illustrated in FIG. 9, in the present fuel cell according to the First Preferred Embodiment, there are formed a plurality of grooves 52 and projections 53 on one of the surfaces of the fuel-electrode electricity collector plates 5 which are disposed against the fuel electrodes 3. Into the grooves 52, the hydrogen is supplied by way of the fuel supply passages 80. The hydrogen present in the grooves 52 works as a negative electrode active material.

Likewise, there are formed a plurality of grooves 62 and projections 63 on one of the surfaces of the oxygen-electrode electricity collector plates 6 which are disposed against the oxygen electrodes 4. Into the grooves 62, the oxygen is supplied by way of the oxygen supply passages 82. The oxygen present in the grooves 62 works as a positive electrode active material. Note that, in FIGS. 6 and 7, the grooves 52 and 62 as well as the projections 53 and 63 are abbreviated for clarity.

In the present fuel cell according to the First Preferred Embodiment, the polymer film 2, the fuel electrodes 3, the oxygen electrodes 4, the fuel-electrode electricity collector plates 5 and the oxygen-electrode electricity collector plates 6 are pressed to integrate by pressing, such as hot-pressing, thereby forming one of the cells 1. During the pressing operation, the projections 53 of the fuel-electrode electricity collector plates 5 are likely to go into the carbon-based fuel electrodes 3. Accordingly, the intrusion of the projections 53 enables to securely provide the contact area between the fuel-electrode electricity collector plates 5 and the fuel electrodes 3, the contactability therebetween, and the integrity therebetween, and at the same time to reduce the contact electric resistance therebetween. All in all, the intrusion eventually results in improved electricity collectability in the fuel-electrode electricity collector plates 5.

Similarly, during the pressing operation, the projections 63 of the oxygen-electrode electricity collector plates 6 are likely to go into the carbon-based oxygen electrodes 4. Accordingly, the intrusion of the projections 63 enables to securely provide the contact area between the oxygen-electrode electricity collector plates 6 and the oxygen electrodes 4, the contactability therebetween, and the integrity therebetween, and at the same time to reduce the contact electric resistance therebetween. All in all, the intrusion eventually results in improved electricity collectability in the oxygen-electrode electricity collector plates 6.

Figure 8:
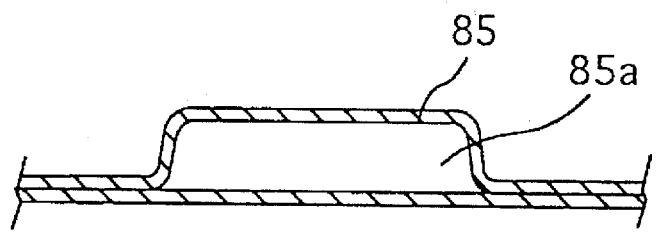
FIG. 8 is a schematic cross-sectional view of a major portion in a coolant circuit in the First Preferred Embodiment of the present fuel cell.
Figure 10:
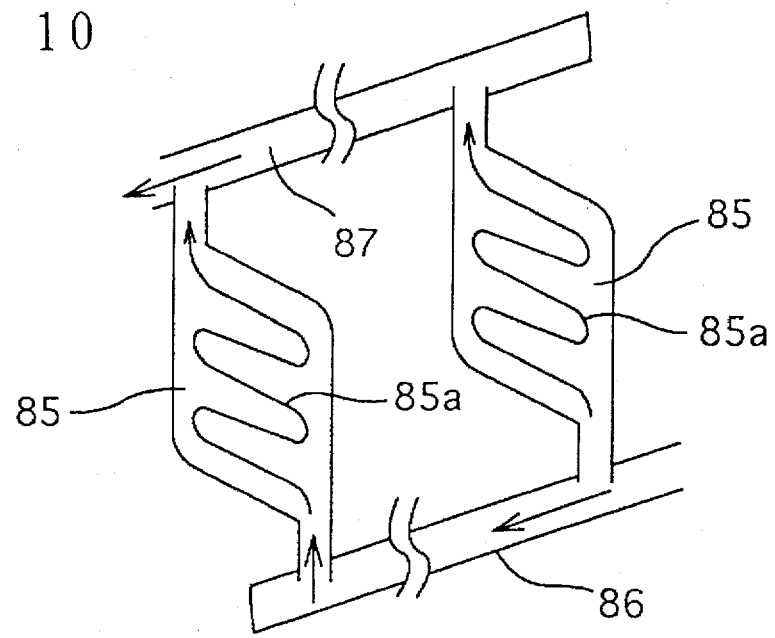
FIG. 10 is a schematic construction diagram of a coolant supply circuit in the First Preferred Embodiment of the present fuel cell.

Moreover, in the First Preferred Embodiment of the present fuel cell, cooling members 85 shown in FIG. 10 are laminated on the fuel-electrode electricity collector plates 5 and the oxygen-electrode electricity collector plates 6. The cooling members 85 communicate with an inlet tube 86 and an outlet tube 87 which are incorporated into the First Preferred Embodiment of the present fuel cell. As illustrated in FIG. 8, the cooling members 85 are constructed by laminating two resin sheets, thereby forming a coolant passage 85a between the resin sheets. The cooling members 85 are disposed on each of the cells 1.

Note that, although the cooling members 85 are designated by hatched areas in FIGS. 6 and 7, they are actually formed as a passage illustrated in FIG. 8 so that they allow water (i.e., a fluid working as a coolant) to flow therein.

When the coolant is supplied into the coolant passage 85a of the cooling members 85, the pressure within the coolant passage 85a increases, and the fuel-electrode electricity collector plates 5 are urged toward the fuel electrodes 3 and the oxygen electrodes 4. Note that the pressure can be determined as desired, for example, in a range of from 1.5 to 3 kgf/cm$^2$. Thus, the pressure increment securely provides the contactability between the fuel-electrode electricity collector plates 5 and the fuel electrodes 3, and between the oxygen-electrode electricity collector plates 6 and the oxygen electrodes 4. As a result, the contact-electric-resistance reduction effect can be expected between the fuel-electrode electricity collector plates 5 and the fuel electrodes 3, and between the oxygen-electrode electricity collector plates 6 and the oxygen electrodes 4. All in all, this arrangement can practically secure improved electricity collectability in the fuel-electrode electricity collector plates 5 and the oxygen-electrode electricity collector plates 6.

In particular, note that the cooling members 85 having the coolant passage 85a are disposed on each of the cells 1. Accordingly, the contact-electric-resistance reduction effect as well as the electricity collectability improvement effect can be expected for each of the cells 1. In addition, the First Preferred Embodiment of the present polymer-film type fuel cell is improved in terms of internal cooling capability, because the cooling members 85 are disposed on each of the cells 1.

As a modified version of the First Preferred Embodiment of the present fuel cell, the cooling members 85 can be disposed adjacent to the fuel-electrode electricity collector plates 5 only. Alternatively, the cooling members 85 can be disposed adjacent to the oxygen-electrode electricity collector plates 6 only.

Second Preferred Embodiment

Figure 11:
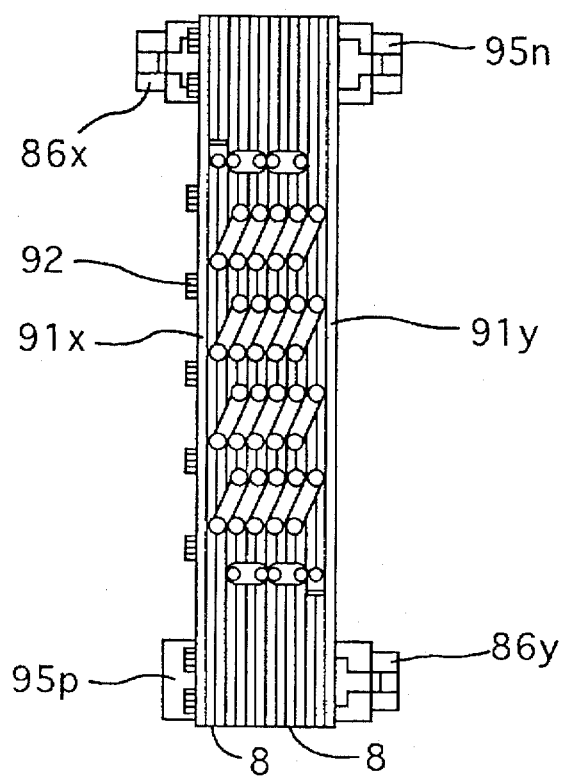
FIG. 11 is a side view of a Second Preferred Embodiment of a polymer-film type fuel cell according to the present invention.
Figure 12:
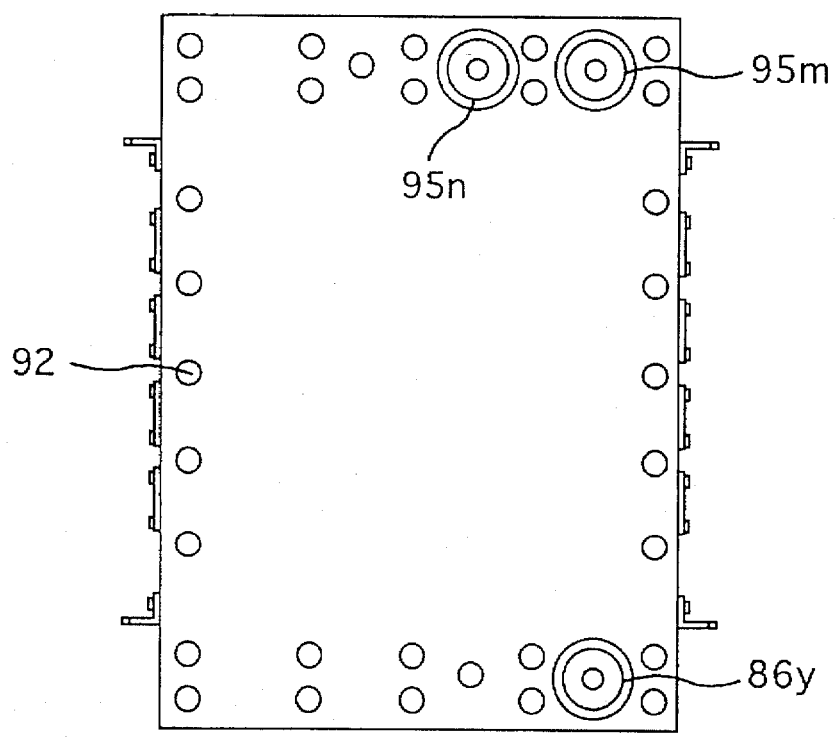
FIG. 12 is a front view of the Second Preferred Embodiment of the present polymer-film type fuel cell.

FIGS. 11 and 12 illustrate a prototype of a polymer-film type fuel cell to which the present invention is applied. In this fuel cell, a plurality of the separators 8 and the cells 1 are laminated in their thickness-wise direction. When assembled, the fuel cell is firmly fixed around its periphery by a plurality of fixtures 92.

As illustrated in FIG. 12, a pipe member adapted for supplying oxygen (e.g., air) is designated at 95m, a pipe member adapted for supplying hydrogen designated at 95n, and, as illustrated in FIG. 11, a pipe member adapted for evacuating hydrogen is designated at 95p. Moreover, an outlet port of the inlet tube 86 is designated at 86x, and an inlet port of the inlet tube 86 is designated at 86y. Note that, although a pipe adapted for evacuating oxygen is not shown in the drawing, it is disposed adjacent to the pipe member 95p adapted for evacuating hydrogen.

Figure 13:
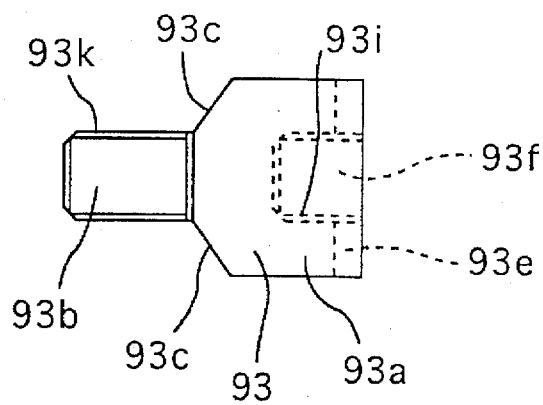
FIG. 13 is a side view of a threaded member in the Second Preferred Embodiment of the present polymer-film type fuel cell.
Figure 14:
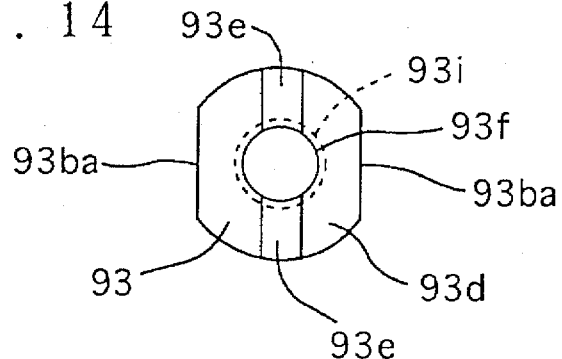
FIG. 14 is a front view of the threaded member.
Figure 15:
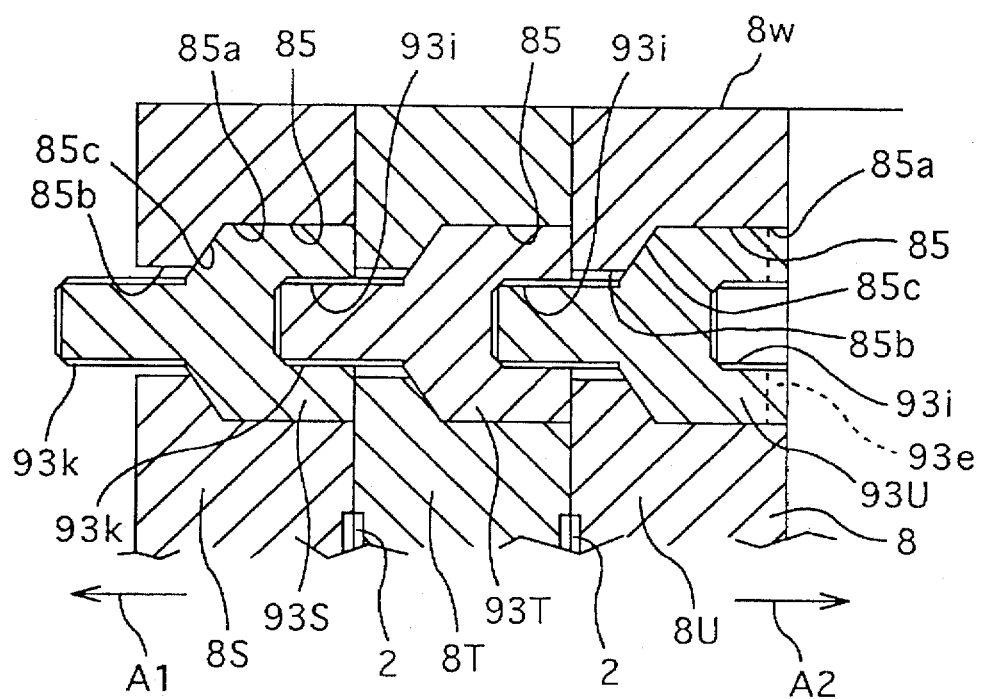
FIG. 15 is a cross-sectional view of a major construction of separators in the Second Preferred Embodiment of the present polymer-film type fuel cell, and illustrates how the separators are connected by the threaded members.
Figure 16:
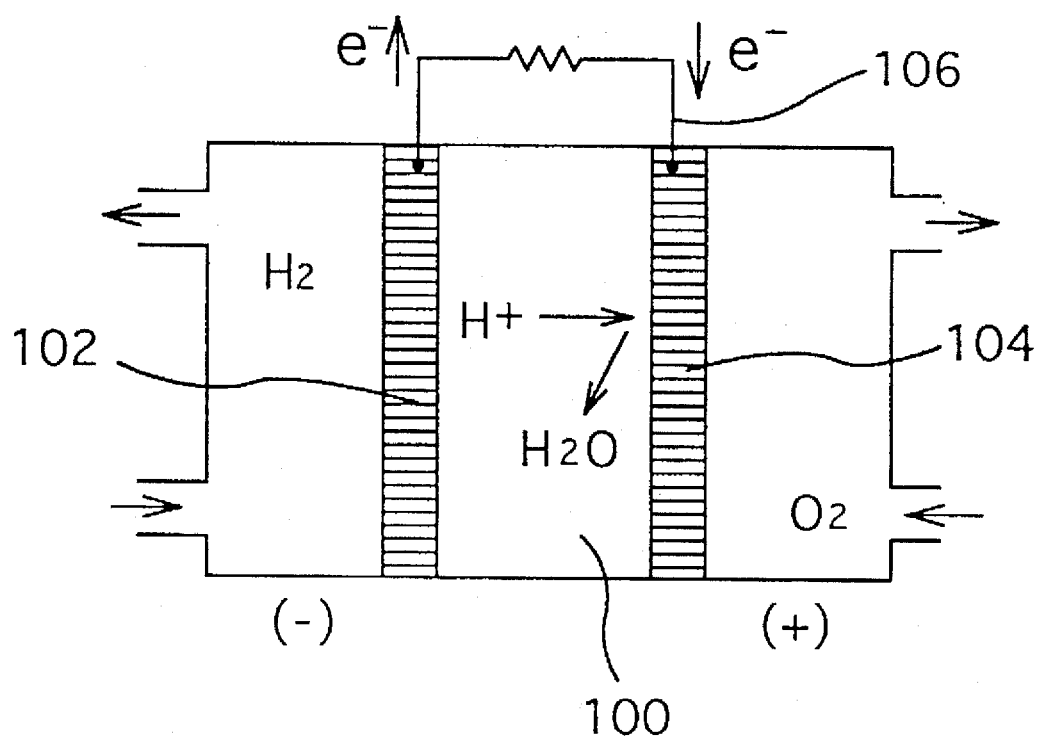
FIG. 16 is a diagram of a conventional polymer-film type fuel cell, and illustrates the operating principle of the prior art.

As illustrated in FIG. 15, on a side 8w of the separators 8 (i.e., one of the sides thereof), there is formed a fixture bore 85, which penetrates through the separators 8 in a thickness-wise direction. The fixture bore 85 includes a major-diameter bore 85a, a minor-diameter bore 85b, and a conical surface 85c. As illustrated in FIGS. 13 and 14, a threaded member 93 includes a major-diameter body 93a, a minor-diameter body 93b, a conical surface 93c, a central connection bore 93f, and a vertical slot 93e. The major-diameter body 93a corresponds with the major-diameter bore 85a of the fixture bore 85, and includes a width-across-flat portion 93ba which allows to rotate the threaded member 93 by using a tool like a spanner. The vertical slot 93e is formed on an end surface 93d of the major-diameter body 93a. The minor-diameter body 93b corresponds with the minor-diameter bore 85b of the fixture bore 85. The conical surface 93c corresponds with the conical surface 85c of the fixture bore 85. The conical surface 93c functions to position the threaded member 93 in a laminating direction of the separators 8. On an inner peripheral wall of the central connection bore 93f of the major-diameter body 93a, there is formed a female-threaded portion 93i. On an outer peripheral wall of the minor-diameter body 93b, there is formed a male-threaded portion 93k. The female-threaded portion 93i and the male-threaded portion 93k can be fitted with each other.

As can be appreciated from FIG. 15, when the threaded members 93 are fitted into the fixture bores 85 of the separators 8, and when the male-threaded portion 93k and the female-threaded portion 93i of the neighboring threaded members 93 are fitted with each other, the separators 8 are connected in their laminating direction. The prototype of the present polymer-film type fuel cell is thus assembled.

The prototype of the present polymer-film type fuel cell illustrated in FIG. 11 can be disassembled as follows; namely: when disassembling the separators 8 from one end of this fuel cell in their laminating direction, all of the fixtures 92 are first dismounted, and then a pressure plate 91x disposed on the end is removed. Thus, the separators 8 can be removed one by one. Alternatively, when disassembling the separators 8 from the other end of this fuel cell in their laminating direction, all of the fixtures 92 are first dismounted, and then a pressure plate 91y disposed on the other end is removed. Thus, the separators 8 can be removed one by one.

FIG. 15 illustrates part of the laminated construction of the separators 8. In the drawing, the separators 8S, 8T, 8U as well as the threaded members 93U, 93T, 93U are shown. From the maintenance-and-control perspective, it is desired that the laminated separators 8 can be removed either in the direction "A1" or in the direction "A2" of FIG. 15.

In the prototype of the present polymer-film type fuel cell, the above-described desirable removing operation is enabled. With reference to FIG. 15, the removing operation will be hereinafter described; namely: the separator 8S is removed in the direction "A1" of the drawing, and the threaded member 93S is exposed. A tool, such as a spanner, is applied to the width-across-flat portion 93ba of the threaded member 93S to rotate the threaded member 93S in its peripheral direction. Thus, the threaded member 93S is removed from the threaded member 93T which is fitted into the fixture bore 85 of the separator 8T. Then, the separator 8T is removed in the direction "A1" of the drawing, and the threaded member 93T is exposed. In the aforementioned manner, the threaded member 93T is rotated in its peripheral direction to separate it from the threaded member 93U. Thus, the threaded member 93S, 93T, and 93U can be disconnected in this order, and accordingly the laminated separators 8 can be removed in one direction (e.g., in the direction "A1" of the drawing).

Moreover, when removing the laminated separators 8 in a direction opposite to the aforementioned direction (e.g., in the direction "A2" of FIG. 15), a tool, such as a screw driver, is fitted into the vertical slot 93e of the threaded member 93U to turn the threaded member 93U in its peripheral direction, thereby disconnecting the threaded member 93U from the threaded member 93T. Then, the separator 8U is removed in the direction "A2" of the drawing. Further, in the same manner, a tool like a screw driver, etc., is fitted into the vertical slot 93e of the threaded member 93T to turn the threaded member 93T in its peripheral direction, thereby disconnecting the threaded member 93T from the threaded member 93S. Then, the separator 8T is removed in the direction "A2" of the drawing. Furthermore, a tool like a screw driver, etc., is fitted into the vertical slot 93e of the threaded member 93S to turn the threaded member 93S, which is fitted into the fixture bore 85 of the separator 8S, in its peripheral direction, thereby disconnecting the threaded member 93T from a threaded member (not shown). Then, the separator 8S is removed in the direction "A2" of the drawing. Thus, the threaded member 93U, 93T, and 93S can be disconnected in this order, and accordingly the laminated separators 8 can be removed in the opposite direction (e.g., in the direction "A2" of the drawing).

The above-described arrangements enable to remove the laminated separators 8 in their laminating direction away from an end of polymer-film type fuel cell, and at the same time they also enable to remove the laminated separators 8 in a direction opposite to their laminating direction away from the other end of polymer-film type fuel cell. Thus, the arrangements are useful in view of maintenance and control of fuel cell.

Modified Versions of Preferred Embodiments

In the above-described First and Second Preferred Embodiments of the present polymer-film type fuel cell, 5 fuel electrodes 3 are disposed adjacent to each other on one of the surfaces of the polymer film 2, and 5 oxygen electrodes 4 are disposed adjacent to each other on the other one of the surfaces of the polymer film 2. In the present invention, however, the numbers of the fuel electrodes 3 and the oxygen electrodes 4 are not limited to those of the First and Second Preferred Embodiments; namely: the numbers can be determined as desired, depending on types of fuel cells to which the present invention is actually applied. For example, the fuel electrodes 3 and the oxygen electrodes 4 can be provided in a quantity of 3, 4, 5, 6, 7, 8, 9, and 10, or more. To put it differently, they can be disposed adjacent to each other thereon in a quantity of 2 or more. Note that, however, the fuel electrodes 3 and the oxygen electrodes 4 disposed on the polymer film 2 must be electrically connected in series.

Further, the First and Second Preferred Embodiments of the present polymer-film type fuel cell employ the polymer film 2 as a solid electrolyte. The present invention, however, is not limited to this arrangement. The solid electrolyte can be determined as desired; namely: it can be solid electrolytes (i.e., solid crystalline salt, such as silver iodide, lead chloride, and so on) which are usually employed by fuel cell and which are made from materials other than polymer.

Furthermore, the First and Second Preferred Embodiments of the present polymer-film type fuel cell employ hydrogen as fuel. The present invention, however, is not limited to this arrangement. The fuel can be determined as desired. In a certain application, the present invention can be applied to construct a fuel cell which utilizes carbon monoxide as fuel.

Having now fully described the present invention, it will be apparent to one of ordinary skill in the art that many changes and modifications can be made thereto without departing from the spirit or scope of the present invention as set forth herein including the appended claims.

For instance, the following engineering ideas (or modifications to the present polymer-film type fuel cell) may be apparent to a person having ordinary skill in the art from the teachings of the above-described First and Second Preferred Embodiments of the present polymer-film type fuel cell:

A fuel cell, comprising:

a plurality of cells laminated in their thickness-wise direction, the cells including:

a solid electrolyte having opposite surfaces, and exhibiting ion conductivity;

a fuel electrode disposed on one of the opposite surfaces of the solid electrolyte, to which fuel working as a negative electrode active material is supplied;

an oxygen electrode disposed on the other one of the opposite surfaces of the solid electrolyte, and electrically connected to the fuel electrode, to which oxygen working as a positive electrode active material is supplied;

a oxygen supply passage; and a fuel supply passage;

the oxygen electrodes of the neighboring cells disposed so as to face each other with respect to the oxygen supply passage; and the fuel electrodes of the neighboring cells disposed so as to face each other with respect to the fuel supply passage.

Another fuel cell, comprising:

a solid electrolyte having opposite surfaces, and exhibiting ion conductivity;

a fuel electrode disposed on one of the opposite surfaces of the solid electrolyte, to which fuel working as a negative electrode active material is supplied;

an oxygen electrode disposed on the other one of the opposite surfaces of the solid electrolyte, and electrically connected to the fuel electrode, to which oxygen working as a positive electrode active material is supplied;

an electricity collector disposed so as to face one of the surfaces of the solid electrolyte, and laminated on at least one of the fuel electrode and the oxygen electrode; and a cooling member laminated on the electricity collector, including a coolant passage in which a coolant flows, urging the electricity collector toward at least one of the fuel electrode and the oxygen electrode by means of pressure resulting from the coolant flowing in the coolant passage, thereby enabling to reduce contact electric resistance between the electricity collector and at least one of the fuel electrode and the oxygen electrode.

What is claimed is:

1. A fuel cell, comprising:

a sheet-shaped solid electrolyte having opposite surfaces, and exhibiting ion conductivity;

at least two fuel electrodes disposed adjacent to each other on one of the opposite surfaces of said solid electrolyte, to which fuel working as a negative electrode active material is supplied;

at least two oxygen electrodes disposed adjacent to each other on the other one of the opposite surfaces of said solid electrolyte, to which oxygen working as a positive electrode active material is supplied;

said fuel electrodes being electrically connected to said oxygen electrodes in series.

2. The fuel cell according to claim 1 including a plurality of said cells.

3. The fuel cell according to claim 2, wherein one of said cells being held between another one of said cells and still another one of said cells;

said oxygen electrodes of one of said cells facing with said oxygen electrodes of another one of said cells; and said fuel electrodes of one of said cells facing with said fuel electrodes of still another one of said cells.

4. The fuel cell according to claim 3, wherein a first separator is disposed between said oxygen electrodes of one of said cells and said oxygen electrodes of another one of said cells; and a second separator is disposed between said fuel electrodes of one of said cells and said fuel electrodes of still another one of said cells.

5. The fuel cell according to claim 4, wherein said first separator includes an oxygen supply passage formed therein; and said second separator included a fuel supply passage formed therein.

6. The fuel cell according to claim 1 further including an electricity collector laminated on at least one of said fuel electrodes and said oxygen electrodes.

7. The fuel cell according to claim 6 including a plurality of said cells.

8. The fuel cell according to claim 7, wherein said electricity collector includes a fuel electrode electricity collector plate being brought into contact with said fuel electrodes disposed adjacent to each other on one of the opposite surfaces of said solid electrolyte, and an oxygen electricity electrode collector being brought into contact with said oxygen electrodes disposed adjacent to each other on the other one of the opposite surfaces of said solid electrolyte.

9. The fuel cell according to claim 8 further including a plurality of conductive members which electrically connect said oxygen electrode electricity collectors and said fuel electrode electricity collectors, disposed on neighboring cells, in series.

10. The fuel cell according to claim 8, wherein said fuel electrode electricity collector has opposite surfaces, and one of the opposite surfaces facing said fuel electrodes has a plurality of projections and a plurality of grooves disposed between the projections, and thereby, when said fuel electrode electricity collectors and said fuel electrodes are pressed against each other, the projections going into said fuel electrodes so as to bond said fuel electrode electricity collectors and said fuel electrodes, and the grooves communicating with the fuel supply passage.

11. The fuel cell according to claim 8, wherein said oxygen electrode electricity collector has opposite surfaces, and one of the opposite surfaces facing said oxygen electrodes has a plurality of projections and a plurality of grooves disposed between the projections, and thereby, when said oxygen electrode electricity collectors and said oxygen electrodes are pressed against each other, the projections going into said oxygen electrodes so as to bond said oxygen electrode electricity collectors and said oxygen electrodes, and the grooves communicating with the oxygen supply passage.

12. The fuel cell according to claim 6, wherein a separator is laminated on said electricity collector disposed on at least one of said fuel electrodes and said oxygen electrodes.

13. The fuel cell according to claim 12, wherein said separator includes opposite surfaces, a fixture bore which penetrates through said separator in a cell laminating direction, and a threaded member which is fitted into the fixture bore rotatably about an axial center of the fixture bore;

the fixture bore includes a major-diameter bore which opens on one of the opposite surfaces of said separator, and a minor-diameter bore which opens on the other one of the opposite surfaces of said separator, which is disposed coaxially with the major-diameter bore, and which faces a major-diameter bore of a fixture bore of another separator neighboring on said separator; and the threaded member includes a major-diameter body which is fitted into the major-diameter bore, and which has a threaded hole and a portion formed on an outer periphery so as to be rotated by a jig, and a minor-diameter body which is fitted into the minor-diameter bore, and which has a male-threaded portion detachably screwed in a threaded hole of a threaded member of another separator neighboring on said separator.

14. The fuel cell according to claim 13, wherein the major-diameter body of the threaded member includes an axial end surface, and an engagement dent formed in the axial end surface, engagement dent which receives a jig therein, which enables to rotate said major-diameter body of said threaded member about the axial center of said fixture bore.

15. The fuel cell according to claim 1, wherein said sheet-shaped solid electrolyte is formed of a polymer film which is capable of passing hydrogen ions therethrough.

16. The fuel cell according to claim 1, wherein said fuel electrodes and said oxygen electrodes are a carbon-based electrode.

17. A fuel cell, comprising:

a plurality of cells;

an oxygen supply passage; and a fuel supply passage;

said cells including:
- a sheet-shaped solid electrolyte having opposite surfaces, and exhibiting ion conductivity;
- at least two fuel electrodes disposed adjacent to each other on one of the opposite surfaces of said solid electrolyte, to which fuel working as a negative electrode active material is supplied;
- at least two oxygen electrodes disposed adjacent to each other on the other one of the opposite surfaces of said solid electrolyte, and electrically connected to said fuel electrodes, to which oxygen working as a positive electrode active material is supplied;

one of said cells being held between another one of said cells neighboring thereon in a direction and still another one of said cells neighboring thereon in another direction;

said oxygen electrodes of one of said cells facing with said oxygen electrodes of another one of said cells, neighboring thereon in a direction, so as to interpose said oxygen supply passage therebetween; and said fuel electrodes of one of said cells facing with said fuel electrodes of still another one of said cells, neighboring thereon in another direction, so as to interpose said fuel supply passage therebetween.

* * * * *